Patented Feb. 19, 1952

2,585,906

UNITED STATES PATENT OFFICE 2,585,906

QUATERNARY SALTS OF PYRIMIDINES

Arthur Donald Ainley, Blackley, Manchester, and Stanley Birtwell, Leeds, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,371. In Great Britain November 5, 1948

14 Claims. (Cl. 260—256.4)

This invention relates to new pyrimidine derivatives and more particularly it relates to the manufacture of quaternary salts derived from pyrimidine derivatives.

According to the invention we manufacture the said new compounds by a process which comprises reacting a 2-, 4- (or 6-) lower alkylaminopyrimidine which is substituted in another of the 2-, 4- (or 6-) positions by a halogen atom or by the group —SR, wherein R is a hydrocarbon radical, and which may be substituted in the remaining 2-, 4- (or 6-) position by a lower alkyl group, a primary amino group or a lower alkylamino group, with a quaternary salt-forming agent.

Quaternary salt-forming agents which may be used in the process of the invention are of the formula Alkyl A wherein A is the radical of an anion, for example, halogen, —SO$_4$CH$_3$ and —SO$_3$C$_6$H$_4$CH$_3$. They include for example methyl iodide, dimethyl sulphate, diethyl sulphate and methyl p-toluene sulphonate.

The reaction may be brought about by heating the reactants together, conveniently in presence of a solvent for example β-ethoxyethanol, methanol, ethanol, acetonitrile, nitrobenzene, nitroethane or ethyl acetate.

As will be understood, there being two nitrogen atoms, not symmetrically placed, in the pyrimidine derivative as defined, there can be formed in the reaction two quaternary salts according to whichever nitrogen atom is involved in the quaternary salt formation. Generally it is found that both compounds are formed but usually one or other of them is formed in predominating amount.

Thus the said new pyrimidine derivatives may be represented generically by the formula

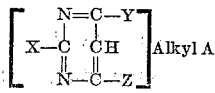

wherein, of X, Y and Z, one is a lower alkylamino group, another is halogen or the group —SR, wherein R is hydrocarbon, and the third is hydrogen, a lower alkyl radical, a primary amino group or lower alkylamino group, and wherein A represents the radical of an anion, for example halogen or the radicals —SO$_4$CH$_3$ or —SO$_3$C$_6$H$_4$CH$_3$.

Of these new pyrimidine derivatives a particularly important group, inasmuch as the compounds of this group are useful as intermediates in the manufacture of especially active trypanocidal substances, may be represented by the formula

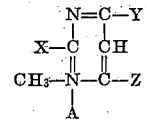

wherein X represents —NHCH$_3$, Y represents Cl or —SAlkyl and Z represents hydrogen, —CH$_3$, —NH$_2$ or —NHCH$_3$.

Also, by way of explanation, it may be said that the new quaternary salts made according to this invention may be regarded either as quaternary salts derived from an aminopyrimidine or, alternatively, as salts of an iminodihydropyrimidine.

When the quaternary salt-forming agent is an alkyl halide, the halogen atom thereof being different from a halogen atom substituent in the pyrimidine compound, there may, in the process of reaction, occur, besides quaternary salt formation, complete or partial replacement of the halogen substituent of the pyrimidine nucleus by the halogen of the alkyl halide. In some cases this may take place more completely in the case of one isomeric quaternary salt than in the case of the other isomeric quaternary salt.

The new quaternary salts are useful in the manufacture of chemotherapeutic agents in particular of new trypanocidal agents by the process of copending U. S. application S. N. 125,372, filed November 3, 1949. They may, if desired, be converted into quaternary salts of a different anion by simple processes of metathesis.

The invention is illustrated but not limited by the following examples in which the parts are by weight.

Example 1

3.2 parts of 4-chloro-2-methylamino-6-methylpyrimidine, (made as described by Johnson and McKenzie, American Chemical Journal, 1909, 42, 363), 6.2 parts of methyl iodide and 10 parts of β-ethoxyethanol are heated under reflux on the steam-bath for 6 hours and the mixture is then cooled and filtered. The residual solid is washed with ethyl acetate and dried. It is then crystallised from 20 parts of water and gives 4 - iodo - 2 - methylamino - 6 - methylpyrimidine methiodide which when recrystallised from ethyl alcohol gives pale yellow plates, M. P. 224° C. (decomp.). To the aqueous mother liquor from the first crystallisation there are added 5 parts of potassium iodide. It is then filtered and the residue, 4-chloro-2-methylamino-6-methylpyrimidine 1-methiodide, is crystallised from ethyl alcohol. It consists of yellowish plates, M. P. 237–238° C. (decomp.).

*Example 2*

8.5 parts of 4-chloro-2-methylamino-6-ethylpyrimidine, 7.0 parts of dimethylsulphate and 20 parts of nitroethane are heated on the steam bath (internal temperature 92° C.) for 6 hours. The mixture is then cooled and extracted with 50 parts of cold water, the aqueous layer is separated, freed from nitroethane by extraction with ether and is then treated with excess of sodium iodide. The solid is filtered off, and crystallised from ethyl alcohol. There is obtained 4-chloro-2-methylamino-6-ethylpyrimidine 1-methiodide as needles, M. P. 149–150° C. (decomp.).

The starting material used in this example may be made as follows:

69 parts of methylisothiourea sulphate is stirred with 50 parts of ice cold water, and with external ice cooling and a solution of 20 parts of sodium hydroxide in 50 parts of water is slowly added to the mixture, followed by 70 parts of ethyl propionylacetate. 20 parts of water are then added, the mixture is stirred at 15–20° C. for 24 hours and then allowed to stand for 48 hours. The solid is filtered off, washed with water, then suspended in 500 parts of water and the suspension is made alkaline to Clayton Yellow by the addition of sodium hydroxide solution. It is then filtered and the filtrate is treated with acetic acid until acid. The crystalline solid is filtered off and consists of 4-hydroxy-2-methylthio-6-ethylpyrimidine, M. P. 152° C. 8.5 parts of 4-hydroxy-2-methylthio-6-ethylpyrimidine and 16 parts of aqueous methylamine (24.4%, w./v.) are then heated together in a closed vessel at 140° C. for 4 hours. The vessel is then cooled and the contents are boiled until free from methylthiol, treated with decolourising carbon and filtered hot. The filtrate is allowed to cool and 4-hydroxy-2-methylamino-6-ethylpyrimidine crystallises out and is filtered off and dried. It has M. P. 162–163° C. 4.6 parts of this 4-hydroxy-2-methylamino-6-ethylpyrimidine and 16 parts of phosphorus oxychloride are mixed together and the mixture is boiled under reflux for 30 minutes. It is then cooled and poured on 100 parts of crushed ice and the suspension is made alkaline to Brilliant Yellow by the addition of ammonium hydroxide solution. The solid is then filtered off, dissolved in hot ethyl alcohol and the solution is diluted with water until turbidity is just produced. It is then cooled and filtered. The crystalline solid so obtained is 4-chloro-2-methylamino-6-ethylpyrimidine of M. P. 74–75° C.

*Example 3*

3.4 parts of 4-chloro-6-amino-2-ethylaminopyrimidine, 3.5 parts of methyliodide and 25 parts of acetonitrile are boiled together under reflux for 5 hours and the mixture is then cooled and filtered. The solid is crystallised from water and consists of 4-chloro-6-amino-2-ethylaminopyrimidine 3-methiodide, M. P. 227° C. (decomp.).

The starting material used in this example may be made as follows:

8.2 parts of 2:4-dichloro-6-aminopyrimidine, 5 parts of ethylamine and 5 parts of ethyl alcohol are boiled together in a closed vessel at 100° C. for 4 hours. The mixture is then diluted with 50% aqueous alcohol, filtered and the filtrate is concentrated by evaporation. It is then cooled and filtered and the solid is crystallised from 30% aqueous ethyl alcohol. There is obtained 4-chloro-6-amino-2-ethylaminopyrimidine, M. P. 113–114° C.

*Example 4*

3.3 parts of 4-chloro-2:6-bis-(methylamino)-pyrimidine, 3.5 parts of methyl iodide and 12 parts of β-ethoxyethanol are heated together at 80–85° C. for 5 hours. The hot mixture is filtered and the residue is crystallised from water. 4-chloro-2:6-bis-(methylamino)-pyrimidine 3-methiodide is obtained, M. P. 217° C. (decomp.).

*Example 5*

3.4 parts of 4-chloro-2:6-bis-(methylamino)-pyrimidine and 4.4 parts of methyl p-toluenesulphonate are mixed and the mixture is heated in an oil bath at 150° C. until the internal temperature which rises to 195° C. begins to fall again. The mixture is then cooled and dissolved in water and the solution is treated with an excess of sodium iodide. The solid is filtered off and crystallised from water. There is obtained 4-chloro-2:6-bis-(methylamino)pyrimidine 3-methiodide, M. P. 217° C. (decomp.).

The starting material used in this example and in Example 4 may be made as follows:

36.6 parts of 2:4:6-trichloropyrimidine are added dropwise to 100 parts of alcoholic methylamine (28% w./v.), stirred and cooled in an ice bath. 150 parts of ethyl alcohol are then added and stirring is continued for 10 minutes. The mixture is then poured into 500 parts of water and the solid consisting of a mixture of 2:4-dichloro-6-methylaminopyrimidine and 4:6-dichloro-2-methylaminopyrimidine is filtered off.

8.9 parts of this mixture of 2:4-dichloro-6-methylaminopyrimidine and 4:6-dichloro-2-methylaminopyrimidine and 10 parts of ethyl alcoholic methylamine (28% w./v.) are heated together in a closed vessel at 100° C. for 2 hours. The reaction mixture is then evaporated to dryness and water is added and the mixture is filtered and the solid is recrystallised from 25% aqueous ethyl alcohol. There is obtained 4-chloro-2:6-bis-(methylamino)pyrimidine, M. P. 134° C.

*Example 6*

9.2 parts of 2-methylthio-4:6-bis-(methylamino)-pyrimidine, 7.8 parts of methyl iodide and 25 parts of nitroethane are boiled together under reflux on the steam bath for 4 hours and the mixture is then cooled, allowed to stand and filtered. The solid is crystallised from water and 2-methylthio-4:6-bis-(methylamino)pyrimidine 1-methiodide is obtained, M. P. 222–223° C. (decomp.).

*Example 7*

3.35 parts of 2-methylthio-4:6-bis-(methylamino)-pyrimidine, 2.9 parts of methyl iodide and 25 parts of ethyl acetate are boiled together under reflux for 4 hours. The mixture is then cooled and filtered. The solid is boiled with water and filtered and the filtrate is treated with an excess of sodium iodide and the solid is filtered off and crystallised from water to give 2-methylthio-4:6-bis(methylamino)pyrimidine 1-methiodide, M. P. 222–223° C.

The starting material used in the above example may be made as follows:

6.4 parts of 4:6-dichloro-2-methylthiopyrimidine are slowly added to 31 parts of ethyl alcoholic methylamine (15% w./v.), the temperature of the mixture being kept at 15–25° C. The reaction mixture is poured into 150 parts of water and filtered. The solid residue is 4-chloro-2-methylthio-6-methylaminopyrimidine and after crystallisation from aqueous ethyl alcohol has M. P. 130–131° C.

6.2 parts of this 4-chloro-2-methylthio-6-methylaminopyrimidine and 8 parts of ethyl alcoholic methylamine (30% w./v.) are heated together in a closed vessel at 100° C. for 12 hours. The mixture is then cooled and the solid is washed first with cold ethyl alcohol and then with water. It is then crystallised from ethyl alcohol to give 2-methylthio-4:6-bis-(methylamino)pyrimidine, M. P. 152–153° C.

Example 8

7.2 parts of 4-chloro-6-methylaminopyrimidine, 8.0 parts of methyl iodide and 25 parts of nitroethane are boiled together under reflux for 2 hours. The mixture is then cooled and filtered and the solid is washed with nitroethane and ether and is then crystallised from water. 4-chloro-6-methylaminopyrimidine 3-methiodide, M. P. 222–223° C. (decomp.) is obtained.

The starting material used in the above example may be made as follows:

340 parts of aqueous hydriodic acid (d. 1.70) and 10 parts of red phosphorus are mixed and boiled together under reflux for 5 minutes. The mixture is then cooled and 24.6 parts of 2:4-dichloro-6-methylaminopyrimidine are slowly added thereto. The mixture is then heated to 45±3° C. and maintained at that temperature for 1 hour. It is then cooled, 200 parts of water are added, and the mixture is filtered. The filtrate is made alkaline to Clayton Yellow with aqueous sodium hydroxide and the solid is filtered off and crystallised from water. There is obtained 4-chloro-6-methylaminopyrimidine, M. P. 137–138° C.

Example 9

5.3 parts of 4-chloro-2-amino-6-methylaminopyrimidine are dissolved in 50 parts of nitroethane and the solution is heated to 85° C.; 4.8 parts of dimethylsulphate are then slowly added and the mixture is heated to 95–97° C. and so maintained for 1 hour. It is then cooled and filtered. The solid is dissolved in water and an excess of sodium iodide is added to the solution which is then filtered and the solid is crystallised from absolute ethyl alcohol and 4-chloro-2-amino-6-methylaminopyrimidine 3-methiodide, M. P. 217° C. (decomp.) is obtained.

Example 10

10.6 parts of 4-chloro-2-amino-6-methylaminopyrimidine, 11.7 parts of diethyl sulphate and 50 parts of nitroethane are boiled together under reflux for 2 hours. The mixture is then cooled and extracted with 75 parts of water. The aqueous extract is made alkaline to Brilliant Yellow with aqueous ammonia and an excess of sodium iodide is then added. The mixture is then filtered and the solid is crystallised from water. 4-chloro-2-amino-6-methylaminopyrimidine 3-ethiodide is obtained, M. P. 177° C.

The starting material used in the above examples may be made as follows:

123 parts of 4:6-dichloro-2-aminopyrimidine and 320 parts of ethyl alcoholic methylamine (15% w./v.) are heated together in an autoclave at 92° C. for 6 hours. The mixture is then cooled and filtered and the solid residue is extracted with 250 parts of boiling water. The extract is cooled and filtered. The solid so obtained is 4-chloro-2-amino-6-methylaminopyrimidine. The alcoholic filtrate from the reaction mixture is evaporated to dryness and the residue is washed with the aqueous filtrate from the 4-chloro-2-amino-6-methylaminopyrimidine obtained above. The residue also consists of 4-chloro-2-amino-6-methylaminopyrimidine and the two are combined and crystallised from water. The product has M. P. 162–163° C.

Example 11

6.0 parts of 4-benzylthio-2-n-butylamino-6-methylpyrimidine, 3.2 parts of dimethyl sulphate and 15 parts of nitrobenzene are heated together at 90° C. for 4½ hours. The mixture is then cooled and diluted with 30 parts of benzene and 200 parts of petroleum ether (B. P. 40°–60° C.) are added to it. The petroleum ether layer is decanted and the residual syrup is washed with 50 parts of petroleum ether. After decanting the petroleum ether is then dissolved in 50 parts of water. The solution is made alkaline with ammonium hydroxide solution, an excess of sodium iodide is added and the oily layer is separated and extracted with benzene. The solid residue is crystallised from water to give 4-benzylthio-2-n-butylamino-6-methylpyrimidine 1-methiodide, M. P. 154° C.

The starting material used in the above example may be made as follows:

11.5 parts of sodium are dissolved in 400 parts of methyl alcohol and 62 parts of benzylthiol are added to the hot solution which is then allowed to stand for 5 minutes and 100 parts of 4-chloro-2-n-butylamino-6-methylpyrimidine are then added. The mixture is then allowed to stand at 15–20° C. for 18 hours and is then boiled under reflux for 3 hours, cooled and filtered. The filtrate is evaporated to a syrup which is poured into 1500 parts of water and filtered. The residue is crystallised from petroleum ether (B. P. 40–60° C.) to give 4-benzylthio-2-n-bytylamino-6-methylpyrimidine, M. P. 59–60° C.

Example 12

10.55 parts of 2-methylthio-4-n-butylamino-6-methylpyrimidine (prepared by interaction of 4-chloro-2-methylthio-6-methylpyrimidine and n-butylamine), 25 parts of methanol and 14.2 parts of methyl iodide are heated together under reflux for 6 hours. The resulting solution is evaporated under reduced pressure and the residual 2-methylthio-4-n-butylamino-6-methylpyrimidine 1-methiodide is crystallised from water. It has then M. P. 164° C.

Example 13

10.5 parts of 2-methylthio-4-n-butylamino-6-methylpyrimidine are stirred in 50 parts of nitrobenzene at 90–95° C. and 12.6 parts of dimethyl sulfate are added to the mixture which is then stirred for 3 hours at 90–95° C., cooled and extracted with water. The aqueous extract is treated with an excess of sodium iodide and filtered. 2-methylthio-4-n-butylamino-6-methylpyrimidine 1-methiodide identical with the product of Example 12 is obtained.

Example 14

17 parts of 4-bromo-2-isopropylamino-6-methylpyrimidine and 50 parts of nitrobenzene are stirred together at 90–95° C. and 18.7 parts of dimethyl sulphate are added. The mixture is then stirred at 90–95° C. for 3 hours, cooled and extracted with water. The aqueous extract is treated with an excess of sodium iodide and filtered. 4 - bromo - 2 - isopropylamino - 6 - methylpyrimidine 1-methiodide is obtained and crystallised from acetonitrile. It has M. P. 222° C. (decomp.).

The starting material may be made as follows:

9.2 parts of sodium are dissolved in 200 parts of methanol, 60 parts of isopropylguanidine sulphate are added to the solution and the mixture is heated under reflux for 10 minutes. 50 parts of ethyl acetoacetate are then added and the mixture is stirred and heated under reflux for 12 hours. It is then filtered, the methanol is evaporated and the solid residue is dissolved in hot dilute aqueous sodium hydroxide and acetic acid is added. The solid is filtered off and crystallised from water. 2-isopropylamino-4-hydroxy-6-methylpyrimidine is obtained of M. P. 136–138° C. (decomp.).

23.1 parts of 2-isopropylamino-4-hydroxy-6-methylpyrimidine and 40 parts of phosphorus oxybromide are heated together at 135° C. for 45 minutes. The mixture is then cooled and crushed ice is added followed by ammonia. The precipitate of 4 - bromo - 2 - isopropylamino - 6 - methylpyrimidine is an oil which gives a picrate, which, crystallised from β-ethoxyethanol, has M. P. 200–201° C. (decomp.).

Example 15

7.55 parts of 4 - chloro - 2 - isopropylamino - 6 - methylpyrimidine are stirred in 50 parts of nitrobenzene at 90–95° C. 10.3 parts of dimethyl sulphate are added and the mixture is maintained at 90–95° C. for 3 hours. It is then cooled and extracted with water and the aqueous extract is treated with an excess of sodium iodide. 4-chloro-2-isopropylamino-6-methylpyrimidine 1-methiodide is filtered off and crystallised from acetonitrile. It has M. P. 222–224° C. (decomp.).

The starting material may be prepared as follows:

10 parts of 2-isopropylamino-4-hydroxy-6-methylpyrimidine and 25 parts of phosphorus oxychloride are heated together under reflux for 30 minutes. The solution is then poured on to ice and made alkaline by the addition of ammonia. The precipitated oil is extracted with chloroform, the chloroform extract is dried and evaporated and 4 - chloro - 2 - isopropylamino - 6 - methylpyrimidine is obtained as an oil.

Example 16

6 parts of 2-methylamino-4-methylthiopyrimidine and 30 parts of nitrobenzene are stirred together at 90–95° C. 10 parts of dimethyl sulphate are added and the temperature is maintained at 90–95° C. for 3 hours. The mixture is then cooled and extracted with water and the extract is treated with an excess of sodium iodide. 2-methylamino-4-methylthiopyrimidine 1-methiodide is filtered off and crystallised from alcohol-light petroleum. It has M. P. 174–176° C.

The starting material may be prepared as follows.

10.2 parts of 2-hydroxy-4-methylthiopyrimidine (Wheeler and Johnson, American Chemical Journal, 1909, 42, 34) and 50 parts of phosphorus oxychloride are heated together under reflux for 15 minutes. The excess of phosphorus oxychloride is distilled off under reduced pressure and the residue is added to crushed ice. It is then made alkaline with ammonia, and 2-chloro-4-methylthiopyrimidine is filtered off and dissolved in ether and the solution is dried and evaporated. The residue is distilled under reduced pressure and has B. P. 125–126° C./15 mm.

50 parts of 30% alcoholic methylamine are added to 8 parts of 2-chloro-4-methylthiopyrimidine dissolved in 25 parts of ethanol. The mixture is allowed to stand in a closed vessel at atmospheric temperature overnight, and is then evaporated to dryness and the residue is washed with water. 2-methylamino-4-methylthiopyrimidine thus obtained is crystallised from petroleum ether (B. P. 80–100° C.) and has M. P. 80° C.

Example 17

19.6 parts of 4-chloro-2-n-butylamino-6-methylpyrimidine are stirred in 80 parts of nitrobenzene and 20 parts of dimethylsulphate are added to the mixture at 90–95° C. The mixture is then stirred at 90–95° C. for three hours, cooled and extracted with 50 parts of water and the extract is treated with an excess of sodium iodide. The 4 - chloro-2-n-butylamino-6-methylpyrimidine 1-methiodide thus obtained is crystallised from water and then has M. P. 210–212° C.

The starting material may be made as follows:

9.2 parts of sodium are dissolved in 200 parts of methanol and 65.6 parts of n-butylguanidine sulphate are added. The mixture is heated under reflux for 10 minutes and 50 parts of acetoacetic ester are then added and the mixture is stirred under reflux for 12 hours. It is then filtered while hot and the filtrate is evaporated to dryness under reduced pressure. The residue is dissolved in hot dilute aqueous sodium hydroxide and the solution is made acid by addition of acetic acid. 2-n-butylamino - 4 - hydroxy-6-methylpyrimidine is filtered off. It gives a picrate which, crystallised from ethanol has M. P. 204° C.

10 parts of 2-n-butylamino-4-hydroxy-6-methylpyrimidine and 20 parts of phosphorus oxychloride are heated together under reflux for 45 minutes, then cooled and poured on to ice and the mixture is made alkaline by addition of sodium hydroxide solution. It is then diluted with water and filtered. The solid is dissolved in ether, the solution is washed with dilute sodium hydroxide, dried and evaporated. The residual 4 - chloro-2-n-butylamino-6-methylpyrimidine is a low melting solid which forms a picrate which, crystallised from alcohol, has M. P. 154–156° C.

Example 18

21.6 parts of 2-ethylamino-4-methylthio-6-methylpyrimidine, 100 parts of acetonitrile and 32.6 parts of methyl iodide are heated together under reflux for 4½ hours. The 2-ethylamino-4-methylthio-6-methylpyrimidine 1-methiodide thus obtained is crystallised from water and has M. P. 226° C. (decomp.).

Example 19

13.75 parts of 2-ethylamino-4-methylthio-6-methylpyrimidine and 100 parts of nitrobenzene are stirred together at 90–95° C. 18.9 parts of dimethyl sulphate are added, and the mixture is stirred at 90–95° C. for 3 hours. It is then extracted with water and the extract is treated with an excess of sodium iodide and filtered. There is obtained 2-ethylamino-4-methylthio-6-methylpyrimidine 1-methiodide.

The starting material may be made as follows:

24 parts of 2-hydroxy-4-methylthio-6-methylpyrimidine (Wheeler and McFarland, American Chemical Journal, 42, 437) and 75 parts of phosphorus oxychloride are heated together under reflux for 1 hour. The excess of phosphorus oxychloride is then distilled under reduced pressure and the residue is poured on to ice and the mixture is made alkaline by addition of ammonia. 2-chloro-4-methylthio-6-methylpyrimidine is filtered off, dissolved in ether and the solution is dried and evaporated. The residue is distilled. It has B. P. 166–168° C. at 70 mm.

30.6 parts of 2-chloro-4-methylthio-6-methylpyrimidine and 135 parts of aqueous ethylamine (33% w./v.) are heated together for 2 hours at 100° C. in a closed vessel. The mixture is then extracted with ether, the ether solution is dried and evaporated, 2-ethylamino-4-methylthio-6-methylpyrimidine is crystallised from light petroleum (B. P. 40–60° C.), and then has M. P. 62° C.

We claim:

1. A process for the manufacture of quaternary salts of pyrimidine derivatives of the general formula:

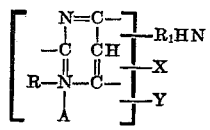

wherein R and R₁ are lower alkyl radicals, A is an anion, X is a radical from the group consisting of halogen and —S alkyl, and Y is a radical from the group consisting of hydrogen, lower alkyl, amino, and —NH alkyl, which comprises reacting the free base form of the pyrimidine with a quaternary salt-forming agent.

2. A process as claimed in claim 1, wherein said salt-forming agent is methyl iodide.

3. A process as claimed in claim 1, wherein said salt-forming agent is dimethyl sulfate.

4. As new compounds, the alkyl quaternary salts of pyrimidine derivatives of the general formula:

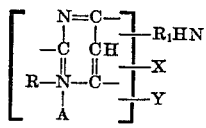

wherein R and R₁ are lower alkyl radicals, A is anion, X is a radical from the group consisting of halogen and —S alkyl, and Y is a radical from the group consisting of hydrogen, lower alkyl, amino, and —NH alkyl.

5. As new compounds, the alkyl quaternary salts of pyrimidine derivatives of the general formula:

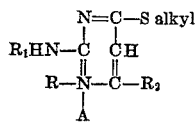

wherein R, R₁ and R₂ are lower alkyl radicals and A is an anion.

6. As new compounds, the alkyl quaternary salts of pyrimidine derivatives of the general formula:

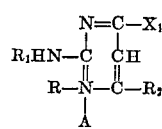

wherein X₁ is a halogen radical, R, R₁ and R₂ are lower alkyl radicals and A is an anion.

7. As new compounds, the alkyl quaternary salts of pyrimidine derivatives of the general formula:

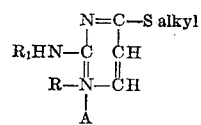

wherein R and R₁ are lower alkyl radicals and A is an anion.

8. As new compounds, the alkyl quaternary salts of pyrimidine derivatives of the general formula:

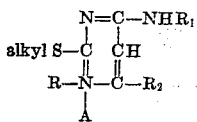

wherein R, R₁ and R₂ are lower alkyl radicals and A is an anion.

9. As new compounds, the alkyl quaternary salts of pyrimidine derivatives of the general formula:

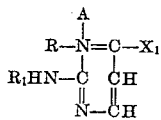

wherein X₁ is a halogen radical, R and R₁ are lower alkyl radicals and A is an anion.

10. As a new compound, 4-benzylthio-2-n-butyl-amino-6-methylpyrimidine 1-methiodide.

11. As a new compound, 4-chloro-2-methylamino-6-methyl pyrimidine 1-methiodide.

12. As a new compound, 2-methylamino-4-methylthiopyrimidine 1-methiodide.

13. As a new compound, 2-methylthio-4-n-butylamino-6-methylpyrimidine 1-methiodide.

14. As a new compound, 4-chloro-6-methylaminopyrimidine 3-methiodide.

ARTHUR DONALD AINLEY.
STANLEY BIRTWELL.
MURIEL RUTH CURD,
*Executrix of the Estate of Francis Henry Swinden Curd, Deceased.*

REFERENCES CITED

The following references are of record in the file of this patent:

UNITED STATES PATENTS

| Number | Name | Date |
|---|---|---|
| 2,068,824 | Schonhofer et al. | Jan. 26, 1937 |
| 2,465,568 | Basford et al. | Mar. 29, 1949 |